(12) United States Patent
Lin

(10) Patent No.: US 9,348,782 B2
(45) Date of Patent: May 24, 2016

(54) ELECTRONIC DEVICE ASSEMBLY

(71) Applicant: HON HAI PRECISION INDUSTRY CO., LTD., New Taipei (TW)

(72) Inventor: Ching-Chung Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/475,733

(22) Filed: Sep. 3, 2014

(65) Prior Publication Data

US 2015/0067205 A1  Mar. 5, 2015

(30) Foreign Application Priority Data

Sep. 3, 2013  (CN) .......................... 2013 1 0394217

(51) Int. Cl.
*G06F 13/12* (2006.01)
*G06F 13/38* (2006.01)
*H01R 27/00* (2006.01)
*G06F 13/42* (2006.01)

(52) U.S. Cl.
CPC ............. *G06F 13/385* (2013.01); *H01R 27/00* (2013.01); *G06F 13/423* (2013.01); *H01R 2201/06* (2013.01)

(58) Field of Classification Search
CPC .. G09G 2370/24; G06F 13/423; G06F 13/385
USPC ...................................... 710/62, 64
See application file for complete search history.

(56) References Cited

U.S. PATENT DOCUMENTS

2012/0066418 A1*  3/2012  Foster ..................... G06F 1/12
                                                    710/61
2014/0173050 A1*  6/2014  Locker .................. H04L 67/06
                                                    709/219

* cited by examiner

*Primary Examiner* — Ernest Unelus
(74) *Attorney, Agent, or Firm* — Novak Druce Connolly Bove+Quigg LLP

(57) ABSTRACT

An electronic device assembly includes a main device, and a plurality of peripheral devices. The main device includes a first connector. Each of the plurality of peripheral devices includes two second connectors. Each first connector and second connector includes various types of interfaces, and the plurality of peripheral devices is coupled to the main device via the various types of interfaces; each peripheral device is coupled to another peripheral device via the second connector, to connect the plurality of peripheral devices one by one in series.

16 Claims, 4 Drawing Sheets

ELECTRONIC DEVICE ASSEMBLY

CROSS-REFERENCE TO RELATED APPLICATIONS

This application claims priority to Chinese Patent Application No. 201310394217.0 filed on Sep. 3, 2013 in the China Intellectual Property Office, the contents of which are incorporated by reference herein.

FIELD

The subject matter herein generally relates to electronic device assemblies.

BACKGROUND

Electronic devices, such as electronic white boards, computer, and so on, are always coupled to a plurality of peripheral devices, such as mobile phones, universal serial buses (USBs), and so on. The plurality of peripheral devices is connected to the main electronic devices in parallel.

BRIEF DESCRIPTION OF THE DRAWINGS

Implementations of the present technology will now be described, by way of example only, with reference to the attached figures.

DETAILED DESCRIPTION

Figure 1:
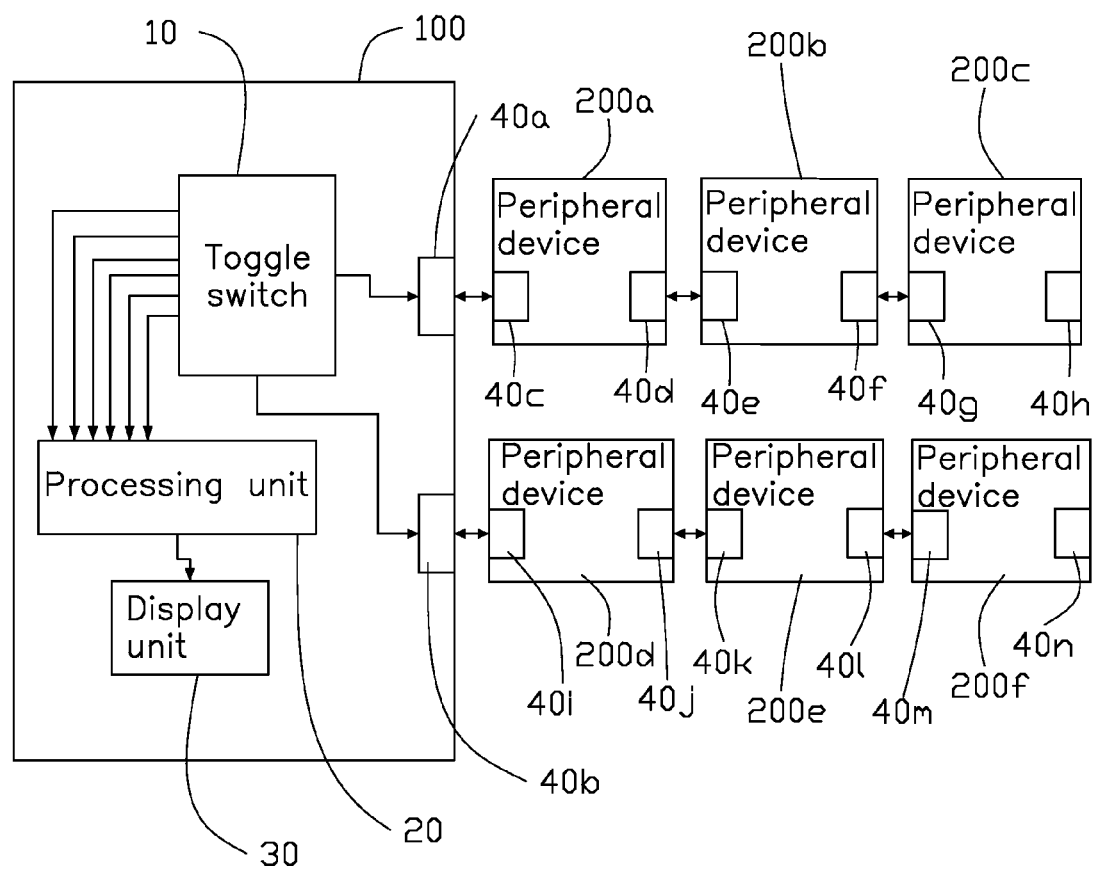
FIG. 1 is a block diagram of one embodiment of an electronic device assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates an electronic device assembly in accordance with an embodiment. The electronic device assembly can include a main device 100 and a plurality of peripheral devices 200a-200f. The peripheral devices 200a, 200b, 200c can be coupled to the main device 100 via a first connector 40a and can be coupled one by one in series. The other peripheral devices 200d, 200e, 200f can be coupled to the main device 100 via a first connector 40b and can be coupled one by one in series. In at least one embodiment, the main device 100 can be a monitor, and the plurality of peripheral devices 200a-200f can be tablet computers, mobile phones, power supplies, hard disks, routers and so on.

The main device 100 can includes a toggle switch 10, a processing unit 20, and a display unit 30. The connector 40a, 40b can be coupled to the toggle switch 10. The toggle switch 10 can include a plurality of output ends corresponding to the plurality of peripheral devices 200a-200f and coupled to the processing unit 20. When one of the plurality of peripheral devices 200a-200f outputs signal to the connector 40a or 40b, the toggle switch 10 can switch the corresponding output end to output the signal to the processing unit 20. In at least one embodiment, when the peripheral device 200a outputs signal to the first connector 40a, the output end of the toggle switch 10, corresponding to the peripheral device 200a, transmits the signal to the processing unit 20. The processing unit 20 comprises a plurality of processors corresponding to the plurality of peripheral devices 200a-200f. The processing unit 20 can select the processor corresponding to the peripheral device 200a to process the signal outputted by the peripheral device 200a, and the signal may be media data.

A second connector 40c of the peripheral device 200a can be coupled to the first connector 40a, and a second connector 40d of the peripheral device 200a can be coupled to a second connector 40e of the peripheral device 200b. A second connector 40f of the peripheral device 200b can be coupled to a second connector 40g of the peripheral device 200c, and a second connector 40h of the peripheral device 200c can be coupled to another peripheral device.

A second connector 40i of the peripheral device 200d can be coupled to the first connector 40b, and a second connector 40j of the peripheral device 200d can be coupled to a second connector 40k of the peripheral device 200e. A second connector 40l of the peripheral device 200e can be coupled to a second connector 40m of the peripheral device 200f, and a second connector 40n of the peripheral device 200f can be coupled to another peripheral device.

Two of the main device 100 and the plurality of peripheral devices 200a-200f are coupled to each other via connectors with different types of interfaces or with same type of interfaces.

Figure 2:
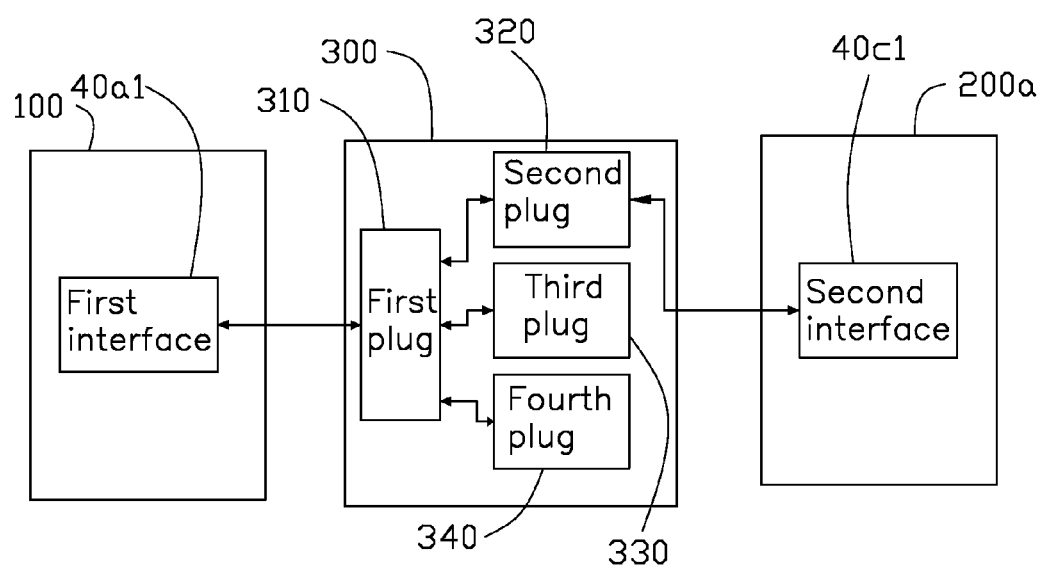
FIG. 2 is a block diagram of first embodiment of a main device, a converting module, and a peripheral device.

FIG. 2 illustrates that in a first embodiment, the first connector 40a of the main device 100 can include a first interface 40a1. The second connector 40c of the peripheral device 200a can include a second interface 40c1 different from the first interface 40a1. The first interface 40a1 can be coupled to the second interface 40c1 via a converting module 300. The converting module 300 can include a first plug 310, a second plug 320, a third plug 330, and a fourth plug 340. The second plug 320, the third plug 330, and the fourth plug 340 can be coupled to the first plug 310. The first plug 310 can be coupled to first interface 40a1, and the second plug 320 can be coupled to the second interface 40c1. The peripheral device 200a can send a first format signal to the second plug 320 via the second interface 40c1. The second plug 320 can transmit the first format signal to the first plug 310, and the first plug 310 can output the first format signal to the first interface 40a1. The main device 1100 can receive the first format signal and can store, process or response the first format signal.

In the first embodiment, the first interface 40a1 is a display port (DP) interface, and the second interface is a high-definition multimedia interface (HDMI). Referring to a form 1-1, the first plug 310 is a DP plug, and the second plug 320 is a HDMI plug. The DP plug can include a ML-Lane0 positive end, a first ground (GND), a ML-Lane0 negative end, a ML-Lane1 positive end, a second GND, a ML-Lane1 negative end, a ML-Lane2 positive end, a third GNG, a ML-Lane2 negative end, a ML-Lane3 positive end, a fourth GND, a ML-Lane3 negative end, a config1 end, a config2 end, a AUX CH positive end, a fifth GND, a AUX CH negative end, a hot plug detect end, a return end, and a DP PWR end. The HDMI plug can include a TMDS2+ end, a first GND, a TMDS2− end, a TMDS1+ end, a second GND, a TMDS1− end, a TMDS0+ end, a third GND, a TMDS0− end, a HRXCP end, a fourth GND, a HRXCN end, a CEC end, a DDC/CEC end, a SCL end, a NC end, a SDA end, a Hot Plug Detect end, and a HDMI PWR end. The TMDS2+ end is electrically coupled to the ML-Lane0. The first GND of the HDMI plug is electrically coupled to the first GND of the DP plug. The TMDS2− end is electrically coupled to the ML-Lane0 negative. The TMDS1+ end is electrically coupled to the ML-Lane1 positive end. The second GND of the HDMI plug is electrically coupled to the second GND of the DP plug. The TMDS1− end is electrically coupled to the ML-Lane1 negative. The TMDS0+ is electrically coupled to the ML-Lane2 positive end. The third GND of the HDMI plug is electrically coupled to the third GND of the DP plug. The TMDS0− end is electrically coupled to the ML-Lane2 negative end. The HRXCP end is electrically coupled to the ML-Lane 3 positive end. The fourth GND of the HDMI plug is electrically coupled to the fourth GND of the DP plug. The DDC/CEC end is electrically coupled to the config2 end. The SCL end is electrically coupled to the AUX CH positive end. The NC end is electrically coupled to the fifth GND of the DP plug. The SDA end is electrically coupled to the AUX CH positive end. The Hot Plug Detect end is electrically coupled to the hot plug detect end. The HDMI PWR end is electrically coupled to the DP PWR end. The second plug 320 transmits the HDMI format signal to the first plug 310 via the second interface 40c1.

The concrete structures of the first plug 310 and the second plug 320 of the converting module 300 are as illustrated in Table 1-1:

TABLE 1-1

| Female Plug | First interface | | Male Plug | First Plug | | Male | Second Plug |
|---|---|---|---|---|---|---|---|
| PIN | Display_Port1.2 | | PIN | Display_Port1.2 | | PIN | HDMI |
| 1 | ML_Lane3(n) | | 1 | ML_Lane0(p) | ↔ | 1 | TMDS2+ |
| 2 | GND | | 2 | GND | ↔ | 2 | GND |
| 3 | ML_Lane3(p) | | 3 | ML_Lane0(n) | ↔ | 3 | TMDS1− |
| 4 | ML_Lane2(n) | | 4 | ML_Lane1(p) | ↔ | 4 | TMDS1+ |
| 5 | GND | | 5 | GND | ↔ | 5 | GND |
| 6 | ML_Lane2(p) | | 6 | ML_Lane1(n) | ↔ | 6 | TMDS1− |
| 7 | ML_Lane1(n) | | 7 | ML_Lane2(p) | ↔ | 7 | TMDS0+ |
| 8 | GND | | 8 | GND | ↔ | 8 | HRXCP |
| 9 | ML_Lane1(p) | | 9 | ML_Lane2(n) | ↔ | 9 | GND |
| 10 | ML_Lane0(n) | | 10 | ML_Lane3(p) | ↔ | 10 | HRXCN |
| 11 | GND | | 11 | GND | ↔ | 11 | GND |
| 12 | ML_Lane0(p) | | 12 | ML_Lane3(n) | ↔ | 12 | HRXCN |
| 13 | CONFIG1 | ↔ | 13 | CONFIG1 | ↔ | 13 | CEC |
| 14 | CONFIG2 | ↔ | 14 | CONFIG2 | ↔ | 17 | DDC/CEC |
| 15 | AUX CH(p) | ↔ | 15 | AUX CH(p) | ↔ | 15 | SCL |
| 16 | GND | ↔ | 16 | GND | ↔ | 14 | NC |
| 17 | AUX CH(n) | ↔ | 17 | AUX CH(n) | ↔ | 16 | SDA |
| 18 | Hot Plug Detect | ↔ | 18 | Hot Plug Detect | ↔ | 19 | Hot Plug Detect |
| 19 | Return | ↔ | 19 | Return | | | |
| 20 | DP PWR | ↔ | 20 | DP PWR | ↔ | 18 | HDMI PWR |

Figure 3:
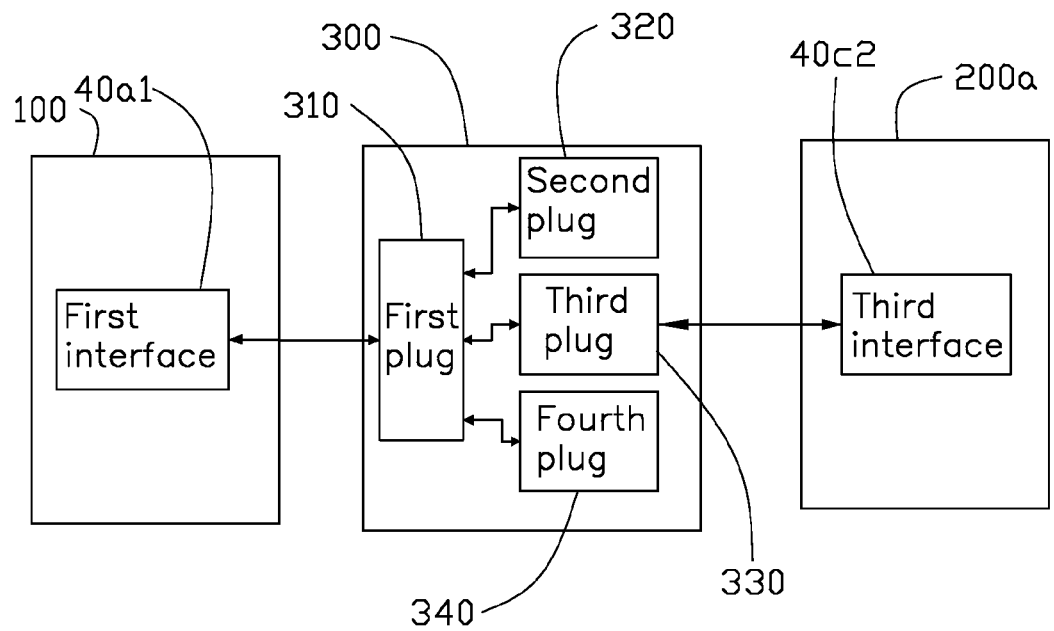
FIG. 3 is a block diagram of second embodiment of a main device, a converting module, and a peripheral device.

FIG. 3 illustrates that in a second embodiment, the connector 40c of the peripheral device 200a can include a third interface 40c2 different from the first interface 40a1. The first interface 40a1 can be coupled to the third interface 40c2 via a converting module 300. The converting module 300 can include a first plug 310, a second plug 320, a third plug 330, and a fourth plug 340. The second plug 320, the third plug 330, and the fourth plug 340 can be coupled to the first plug 310. The first plug 310 can be coupled to first interface 40a1, and the third plug 330 can be coupled to the third interface 40c2. The peripheral device 200a can send a second format signal different from the first format signal to the third plug 330 via the third interface 40c2. The third plug 330 can transmit the second format signal to the first plug 310, and the first plug 310 can output the second format signal to the first interface 40a1. The main device 100 can receive the second format signal and can store, process or response the first format signal.

In the second embodiment, the first interface 40a1 is a display port (DP) interface, and the third interface is a universal serial bus (USB) interface. Referring to following a form 1-2, the first plug 310 is a DP plug, and the third plug 330 is a USB plug. The DP plug can include a ML-Lane0 positive end, a first ground (GND), a ML-Lane0 negative end, a ML-Lane1 positive end, a second GND, a ML-Lane1 negative end, a ML-Lane2 positive end, a third GNG, a ML-Lane2 negative end, a ML-Lane3 positive end, a fourth GND, a ML-Lane3 negative end, a config1 end, a config2 end, a AUX CH positive end, a fifth GND, a VBUS end, a D− end, a D+ end, and a GND end, STDA_SSRX− end, a STDA_SSRX+ end, a GND_DRAIN end, a STDA_SSTX− end, and a STDA_SSTX+ end. The D+ end is electrically coupled to the ML-Lane0 positive end. The GND end is electrically coupled to the first GND end. The D− end is electrically coupled to the ML-Lane0 negative end. The STDA_SSRX+ end is electrically coupled to the ML-Lane1 positive end. The GND_SRAN end is electrically coupled to the second GND. The STDA_SSRX end is electrically coupled to the ML-Lane1 positive end. The STAD_SSTX+ end is electrically coupled to the ML-Lane2 positive end. The STDA_SSTX− end is electrically couple to the ML-Lane2 negative end. The third interface 40c2 outputs a USB format signal. The third plug 330 of the converting module 300 can transmit the USB format signal to the first plug 310, and the first plug 310 can output the USB format signal to the first interface 40a1.

Figure 4:
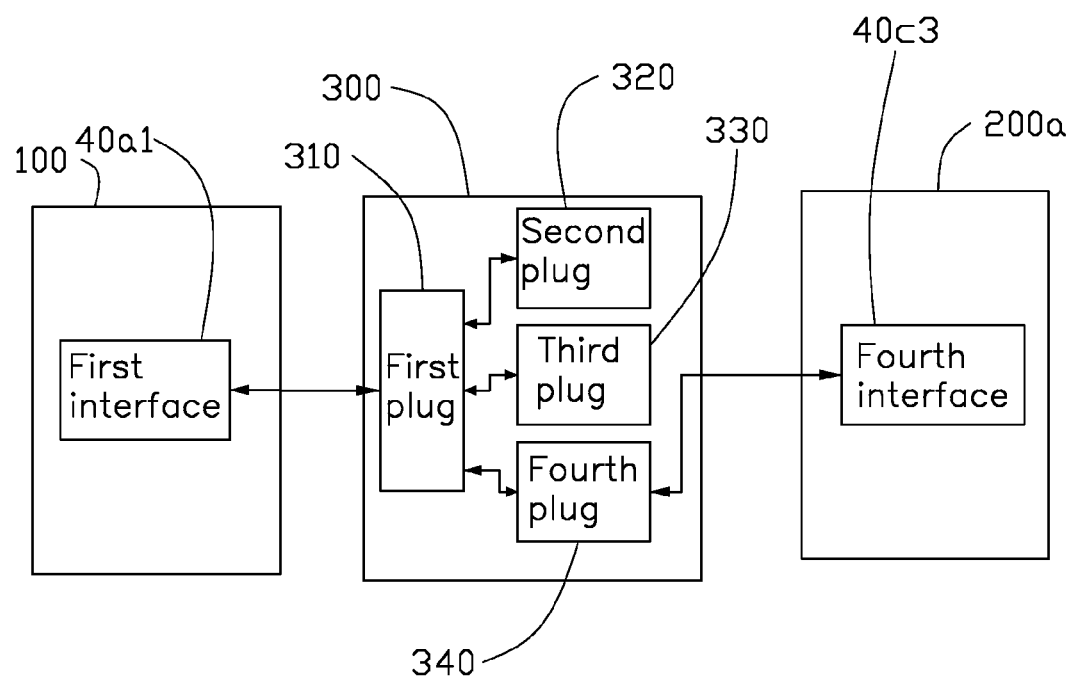
FIG. 4 is a block diagram of third embodiment of a main device, a converting module, and a peripheral device.

The concrete structures of the first plug 310 and the third plug 330 of the converting module 300 are as illustrated in Table 1-2 below:

FIG. 4 illustrates that in a third embodiment, the second connector 40c of the peripheral device 200a can include a fourth interface 40c3 different from the first interface 40a1. The first interface 40a1 can be coupled to the fourth interface 40c3 via a converting module 300. The converting module 300 can include a first plug 310, a second plug 320, a third plug 330, and a fourth plug 340. The second plug 320, the third plug 330, and the fourth plug 340 can be coupled to the first plug 310. The first plug 310 can be coupled to first interface 40a1, and the fourth plug 340 can be coupled to the fourth interface 40c3. The peripheral device 200a can send a third format signal different from the first format signal and the second format signal to the fourth plug 340 via the fourth interface 40c3. The fourth plug 340 can transmit the third format signal to the fourth plug 340, and the first plug 310 can output the third format signal to the first interface 40a1. The main device 100 can receive the third format signal and can store, process or response the first format signal.

In the third embodiment, the first interface 40a1 is a display port (DP) interface, and the fourth interface is a local area network (LAN) interface. Referring to following a form 1-3, the first plug 310 is a DP plug, and the fourth plug 340 is a LAN plug. The DP plug can include a ML-Lane0 positive end, a first ground (GND), a ML-Lane0 negative end, a ML-Lane1 positive end, a second GND, a ML-Lane1 negative end, a ML-Lane2 positive end, a third GNG, a ML-Lane2 negative end, a ML-Lane3 positive end, a fourth GND, a ML-Lane3 negative end, a config1 end, a config2 end, a AUX CH positive end, a fifth GND, a AUX CH negative end, a hot plug detect end, a Return end, and a DP PWR end. The LAN plug can include a transceive data+ end, a transceive data− end, a receive data+ end, a receive data− end. The tranceive data+ end is electrically coupled to the ML-Lane0 positive end. The transceiver data+ is electrically coupled to the ML-Lane1 negative end. The fourth interface 40c3 can output a LAN format signal. The fourth plug 340 can transmit the LAN format signal to the first plug 310, and the first plug 310 can output the LAN format signal to the first interface 40a1.

The concrete structures of the first plug 310 and the fourth plug 340 of the converting module 300 are as illustrated in Table 1-3 below:

TABLE 1-2

| Female plug | First interface | | Male plug | First Plug | | Male plug | Second Plug |
|---|---|---|---|---|---|---|---|
| PIN | Display_Port1.2 | | PIN | Display_Port1.2 | | PIN | USB3.0 |
| 1 | ML_Lane3(n) | | 1 | ML_Lane0(p) | ↔ | 3 | D+ |
| 2 | GND | | 2 | GND | ↔ | 4 | GND |
| 3 | ML_Lane3(p) | | 3 | ML_Lane0(n) | ↔ | 2 | D− |
| 4 | ML_Lane2(n) | | 4 | ML_Lane1(p) | ↔ | 6 | STDA_SSRX+ |
| 5 | GND | | 5 | GND | ↔ | 7 | GND_DRAIN |
| 6 | ML_Lane2(p) | | 6 | ML_Lane1(n) | ↔ | 5 | STDA_SSRX− |
| 7 | ML_Lane1(n) | | 7 | ML_Lane2(p) | ↔ | 9 | STDA_SSTX+ |
| 8 | GND | | 8 | GND | | | |
| 9 | ML_Lane1(p) | | 9 | ML_Lane2(n) | ↔ | 8 | STDA_SSTX− |
| 10 | ML_Lane0(n) | | 10 | ML_Lane3(p) | | | |
| 11 | GND | | 11 | GND | | | |
| 12 | ML_Lane0(p) | | 12 | ML_Lane3(n) | | | |
| 13 | CONFIG1 | ↔ | 13 | CONFIG1 | | | |
| 14 | CONFIG2 | ↔ | 14 | CONFIG2 | | | |
| 15 | AUX CH(p) | ↔ | 15 | AUX CH(p) | | | |
| 16 | GND | ↔ | 16 | GND | | | |
| 17 | AUX CH(n) | ↔ | 17 | AUX CH(n) | | | |
| 18 | Hot Plug Detect | ↔ | 18 | Hot Plug Detect | | | |
| 19 | Return | ↔ | 19 | Return | | | |
| 20 | DP PWR | ↔ | 20 | DP PWR | ↔ | 1 | VBUS |

TABLE 1-3

| Female Plug PIN | First interface Display_Port1.2 | Male Plug PIN | First Plug Display_Port1.2 | Male plug PIN | Second Plug LAN |
|---|---|---|---|---|---|
| 1 | ML_Lane3(n) | 1 | ML_Lane0(p) ←→ | 1 | Tranceive Data+ |
| 2 | GND | 2 | GND | | |
| 3 | ML_Lane3(p) | 3 | ML_Lane0(n) ←→ | 2 | Tranceive Data+ |
| 4 | ML_Lane2(n) | 4 | ML_Lane1(p) ←→ | 3 | Receive Data+ |
| 5 | GND | 5 | GND | | |
| 6 | ML_Lane2(p) | 6 | ML_Lane1(n) ←→ | 6 | Receive Data+ |
| 7 | ML_Lane1(n) | 7 | ML_Lane2(p) | 4 | Not connected |
| 8 | GND | 8 | GND | 5 | Not connected |
| 9 | ML_Lane1(p) | 9 | ML_Lane2(n) ←→ | 7 | Not connected |
| 10 | ML_Lane0(n) | 10 | ML_Lane3(p) ←→ | 8 | Not connected |
| 11 | GND | 11 | GND | | |
| 12 | ML_Lane0(p) | 12 | ML_Lane3(n) | | |
| 13 | CONFIG1 | 13 | CONFIG1 | | |
| 14 | CONFIG2 | 14 | CONFIG2 | | |
| 15 | AUX CH(p) | 15 | AUX CH(p) | | |
| 16 | GND | 16 | GND | | |
| 17 | AUX CH(n) | 17 | AUX CH(n) | | |
| 18 | Hot Plug Detect | 18 | Hot Plug Detect | | |
| 19 | Return | 19 | Return | | |
| 20 | DP PWR | 20 | DP PWR | | |

The embodiments shown and described above are only examples. Many details are often found in the art such as the other features of an electronic device assembly. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

ELEMENT LISTING

10 toggle switch
20 processing unit
30 display unit
200*a*~200*f* peripheral device
40*a*1 first interface
310 first interface
320 second plug
330 third plug
340 fourth plug
40*c*1 second interface
40*c*2 third interface
40*c*3 fourth interface

What is claimed is:

1. An electronic device assembly comprising:
   a main device comprising a first connector, which comprises a first interface and a converting module, the converting module comprises a first plug coupled to the first interface, a second plug coupled to the first plug directly, and a third plug coupled to the first plug directly; and
   a plurality of peripheral devices, each peripheral device comprising two second connectors and being coupled to the main device via the first connector;
   wherein each second connector comprises various types of interfaces, the main device is coupled to the plurality of the peripheral devices via the various types of interfaces; and
   each peripheral device is coupled to another peripheral device via at least one second connector, thereby connecting the plurality of peripheral devices one by one in series;
   wherein the various types of interfaces comprise a second interface and a third interface, the second interface is couplable to the second plug, and the third interface is couplable to the third plug;
   wherein the type of the second plug is different from the type of the third plug, the type of the first interface is the same as that of the first plug, the type of the second plug is the same as that of the second interface, the type of the third plug is the same as that of the third interface, and the type of each interface and plug is high-definition multimedia interface (HDMI), universal serial bus (USB), display port (DP), or local area network (LAN).

2. The electronic device assembly of claim 1, wherein the converting module further comprises a fourth plug coupled to the first plug directly, the various types of interfaces further comprise a fourth interface couplable to the fourth plug, and the type of the fourth plug is different from the types of the second plug and the third plug.

3. The electronic device assembly of claim 2, wherein the number of pins of the first plug is greater than the number of pins of the first interface, the second interfaces, the third interface, or the fourth interface.

4. The electronic device assembly of claim 3, wherein the first interface is a DP interface, the second interface is an HDMI interface, the third interface is a USB interface, and the fourth interface is a LAN interface.

5. The electronic device assembly of claim 1, wherein the main device is a monitor, the plurality of peripheral devices is a tablet computer, a power supply, or a hard drive disk.

6. The electronic device assembly of claim 1, wherein the main device comprises a toggle switch, and the toggle switch is coupled to the first connector of the main device and is configured to switch an output corresponding to the peripheral device.

7. The electronic device assembly of claim 6, wherein the main device further comprises a processing unit, and the processing unit is configured to select a processor corresponding to the peripheral device to process the signal.

8. The electronic device assembly of claim 7, wherein the main device further comprises a display unit coupled to the processing unit, and the display unit is configured to display media data from the main device or the plurality of peripheral devices.

9. An electronic device assembly comprising:
a plurality of electronic devices connected to each other, wherein each electronic device comprises a connector, the connector comprises various types of interfaces, each electronic device is coupled to another electronic device via the various types of interface, thereby connecting the plurality of electronic devices one by one in series; the plurality of peripheral devices comprises a main device and a plurality of peripheral devices connected to the main device one by one in series;
wherein the type of connector of each interface is different from that or those of other interfaces, and the type of each interface is high-definition multimedia interface (HDMI), universal serial bus (USB), display port (DP), or local area network (LAN);
wherein the main device comprises a first connector, each peripheral device comprises two second connectors, and the plurality of peripheral devices is coupled to the main device via the first connector, and the plurality of peripheral devices is coupled to one by one in series via the second connector;
wherein the first connector comprises a first interface and a converting module coupled to the first interface, the converting module comprises a first plug coupled to the first interface, a second plug coupled to the first plug directly, and a third plug coupled to the first plug directly; the various types of interfaces comprise a second interface and a third interface, the second interface is couplable to the second plug, and the third interface is couplable to the third plug; the type of the second plug is different from that of the third plug, the type of the first interface is the same as that of the first plug, the type of the second plug is the same as that of the second interface, the type of the third plug is the same as that of the third interface, and the type of each plug is HDMI, or USB, or DP, or LAN.

10. The electronic device assembly of claim 9, wherein the number of pins of the first plug is greater than the number of pins of the first interface, the second interfaces, the third interface, or the fourth interface.

11. The electronic device assembly of claim 10, wherein the first interface is a DP interface, the second interface is an HDMI interface, the third interface is a USB interface, and the fourth interface is a LAN interface.

12. The electronic device assembly of claim 9, wherein the main device is a monitor, the plurality of peripheral devices is a tablet computer, a power supply, or a hard drive disk.

13. The electronic device assembly of claim 9, wherein the main device comprises a toggle switch, and the toggle switch is coupled to the first connector of the main device and is configured to switch an output corresponding to the peripheral device.

14. The electronic device assembly of claim 13, wherein the main device further comprises a processing unit, and the processing unit is configured to select a processor corresponding to the peripheral device to process the signal.

15. The electronic device assembly of claim 14, wherein the main device further comprises a display unit coupled to the processing unit, and the display unit is configured to display media data from the main device or the plurality of peripheral devices.

16. The electronic device assembly of claim 9, wherein the converting module further comprises a fourth plug coupled to the first plug directly, the various types of interfaces further comprise a fourth interface couplable to the fourth plug, and the type of the fourth plug is different from that of each second plug and each third plug.

* * * * *